United States Patent [19]
Lagally et al.

[11] 3,724,919
[45] Apr. 3, 1973

[54] LOW FRICTION SEAWATER LUBRICATED BEARING JOURNAL ARRANGEMENT

[75] Inventors: Paul Lagally; Robert P. Nagy, both of Annapolis, Md.

[73] Assignee: The United States of America as represented by the Secretary of the Navy

[22] Filed: Dec. 28, 1971

[21] Appl. No.: 213,212

Related U.S. Application Data

[63] Continuation-in-part of Ser. No. 6,186, Jan. 27, 1970, abandoned.

[52] U.S. Cl. ............. 308/238, 252/12.2, 308/DIG. 7, 308/DIG. 8
[51] Int. Cl. ............................................. F16c 33/20
[58] Field of Search ........ 308/240, 238, 241; 252/12, 252/12.2, 12.4, 12.6, 49.3; 184/1 E

[56] References Cited
UNITED STATES PATENTS

| | | | |
|---|---|---|---|
| 2,183,556 | 12/1939 | Fawcett | 317/258 |
| 2,246,092 | 6/1941 | Gilman | 308/238 |
| 2,622,993 | 12/1952 | McCullough | 308/241 |
| 3,215,630 | 11/1965 | Compton | 252/49.3 |

OTHER PUBLICATIONS

Kirk–Othmer, "Encyclopedia Of Chemical Technology," 2nd Ed., Vol. 14, pp. 246–250.

*Primary Examiner*—Charles J. Myhre
*Assistant Examiner*—Barry Grossman
*Attorney*—R. S. Sciascia et al.

[57] ABSTRACT

A new type of low friction bearing-journal arrangement which can be lubricated by seawater wherein the rubbing surface of a titanium journal in combination with a high density of polyethylene bearing is protected against scuffing or galling by a small concentration of iodine which may be absorbed at the bearing surface or be present as a water-soluble iodine salt or complex.

4 Claims, 7 Drawing Figures

PATENTED APR 3 1973 3,724,919

INVENTORS
PAUL LAGALLY
ROBERT P. NAGY
BY
*D. E. Hodges*
ATTORNEY

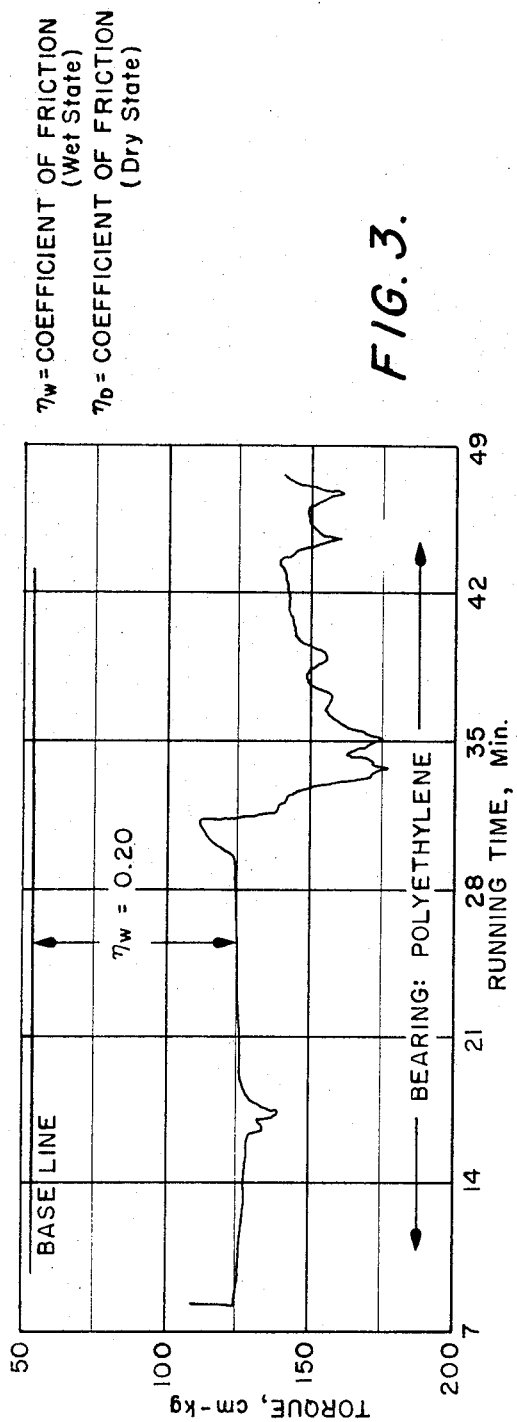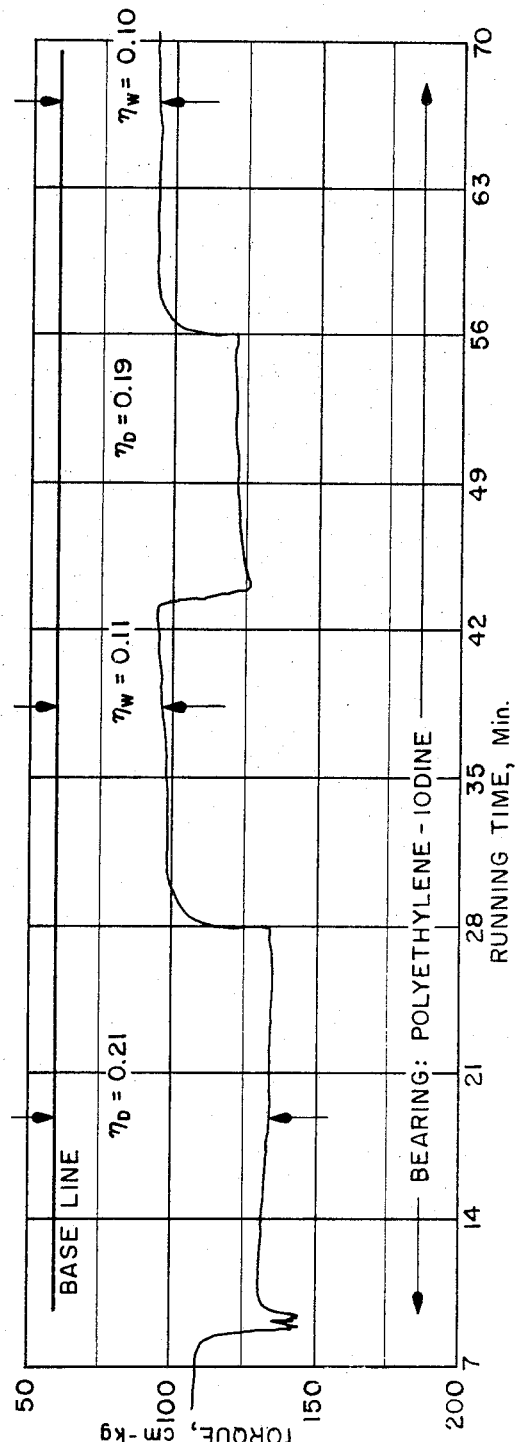

INVENTORS
PAUL LAGALLY
ROBERT P. NAGY
BY
ATTORNEY

LOW FRICTION SEAWATER LUBRICATED BEARING JOURNAL ARRANGEMENT

CROSS REFERENCE TO RELATED APPLICATIONS

This application is a continuation-in-part of application Ser. No. 6,186 filed Jan. 27, 1970 now abandoned.

The invention described herein may be manufactured and used by or for the Government of the United States of America for Governmental purposes without the payment of any royalties thereon or therefor.

BACKGROUND OF THE INVENTION

The search for materials to be used in sliding contact applications is rapidly moving into areas where conventional bearing-journal designs usually fail. This is particularly true for machine elements lubricated by seawater where problems such as pinholes, delamination of coating films and corrosion occur. New approaches are required to overcome problems ordinarily encountered.

The use in a seawater environment of high density polyethylene as a bearing material and a high modulus supporting material as a journal has been recently disclosed by Paul Lagally in a Pat. application, Ser. No. 6,187, filed Jan. 27, 1970 now abandoned. With this type of a bearing-journal arrangement, smooth and vibration-free sliding normally occurs. An exception to the preferred type of operation exists when the high modulus supporting journal material is selected from elements of Group IV-B of the Periodic Table, such as titanium or its alloys because of their tendency to gall, scuff or fret and thereby produce undesirable vibration phenomena even when the mating bearing surface is non-metallic. This is particularly true when foreign solid matter, e.g., silt, sand or other abrasives, is introduced into the sliding interface. In view of the valuable material characteristics and high strength-low weight ratio of titanium and particularly the resistance to corrosion characteristic of titanium alloys, it would be extremely desirable to prevent, scuffing, galling and fretting in this type of journal.

SUMMARY OF THE INVENTION

The invention relates to new sliding contact applications for submerged machinery. More particularly, it relates to a novel bearing-journal arrangement, being lubricated by seawater and capable of operating in the dry state without showing signs of vibrational motions when the lubricant is lost. Accordingly, the instant inventive matter consists of a high density polyethylene bearing which is in sliding contact with a corrosion-resistant high modulus supporting metal journal both of which are not affected by seawater or by a great majority of other corrosive liquids. As has been demonstrated by U.S. Pat. application No. 6,187, such a bearing-journal design, when lubricated or submerged in seawater, ordinarily fills all requirements. However, to protect this bearing-journal design against scuffing, galling or fretting resulting from introduced foreign solid matter such as silt or sand, the rubbing surface is protected by a minute quantity of iodine present in or furnished from underneath the surface of the high density polyethylene used as the bearing material.

OBJECTS OF THE INVENTION

It is a primary object of the instant invention to provide a new type of low friction, seawater lubricated bearing-journal design or other sliding contact arrangement wherein the lubricant contains a small concentration of iodine salt or complex as may be present in or be obtained from the seawater. This enables the new bearing arrangement, according to the invention, to slide alternatively dry or wet, without showing any signs of galling even when foreign abrasive matter has been introduced into the sliding interface.

Another object of the instant invention is to provide a low friction, seawater-lubricated bearing-journal design whereby the bearing is made from high density polyethylene containing iodine. Small quantities of iodine are tenaciously retained by high density polyethylene but instantaneously transferred to unprotected sites on the mating metal journal.

Other objects and many of the attendant advantages of the instant invention will be readily appreciated as the same becomes better understood by reference to the following detailed description when considered in connection with the accompanying drawings wherein:

BRIEF DESCRIPTION OF THE DRAWINGS

FIG. 3 graphically represents the coefficient of friction that exists between a high density polyethylene bearing sliding against a titanium journal with water as a lubricant (prior art);

FIG. 5 depicts the same information as FIG. 3 except the high density polyethylene bearing is impregnated with iodine.

DESCRIPTION OF THE PREFERRED EMBODIMENT

Figure 1:
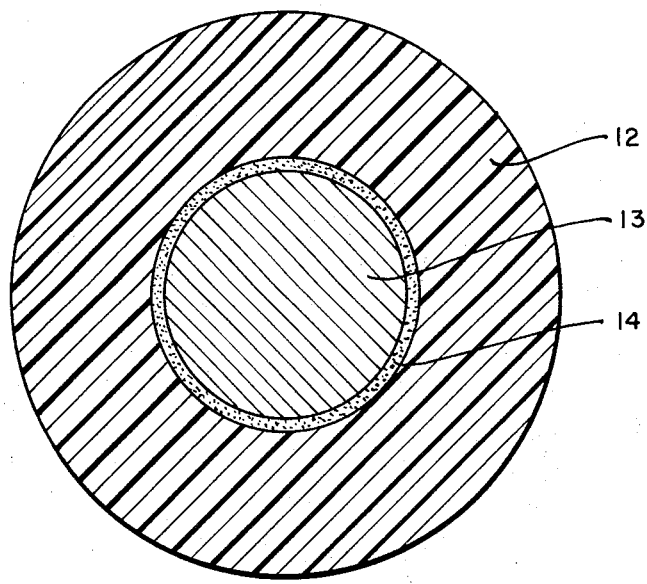
FIG. 1 illustrates a cross-sectional view of a seawater lubricated bearing-journal arrangement wherein the lubricant contains a small concentration of iodine salt or complex.

Referring to FIG. 1, reference numeral 11 designates a conventional bearing-journal arrangement comprising a hollow cylindrical bearing 12 of high density polyethylene and a solid cylindrical journal 13 of a Group IV-B type element, such as titanium. The inside diameter of the bearing is slightly greater than the outside diameter of the journal so that the journal can rotate freely within the bearing. A lubricant 14 is provided between the rubbing surfaces of the bearing and journal. The lubricant 14 contains a seawater base to which is added a small concentration of iodine salt or complex.

Figure 2:
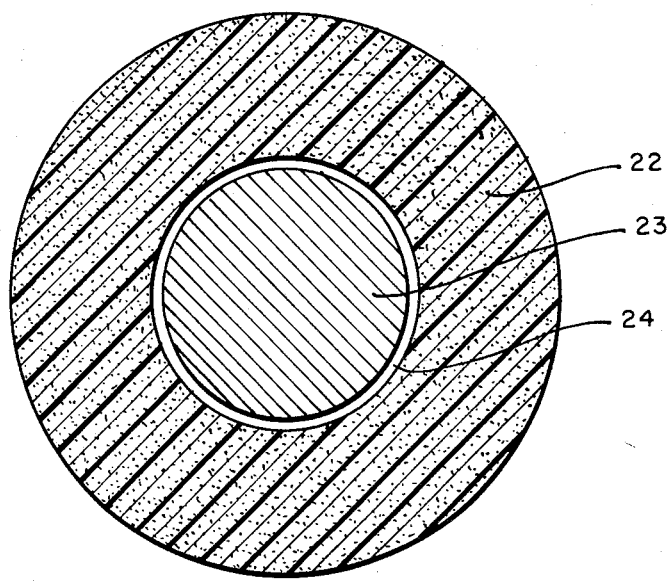
FIG. 2 illustrates a cross-sectional view of a seawater lubricated bearing-journal design wherein the bearing is made from a high density polyethylene material impregnated with iodine.

FIG. 2 depicts essentially the same bearing-journal arrangement as FIG. 1 with a few modifications. Bearing 22, as bearing 12, is made from a high density polyethylene material, but, furthermore, is impregnated with iodine. Also, lubricant 24 is plain seawater and contains no additional additives as does lubricant 14. Journal 23 is the same in both figures.

The novelty of the instant invention lies in the addition in a particular manner of some form of iodine to the titanium journal, thereby enhancing its resistance to galling, scuffing or fretting when seawater is the lubricant. It is well known in the art that when certain compounds, as represented by charge transfer complexes of butylbenzene and iodine, are added in small quantities to a lubricating oil under conditions where water is substantially absent, galling is prevented, friction and wear is reduced, and load carrying capability is increased (R.W. Roberts and R.S. Owens, "Boundary Lubrication of Titanium-Titanium and Titanium-Steel," Wear, 6 (1963) 444–456).

Additionally, when iodine compounds are present in the lubricating oil in a titanium journal environment, titanium iodide is formed by the action of the bearing and journal surfaces rubbing against each other. Since titanium iodide is sensitive to hydrolysis, it would be expected that water-soluble titanium compounds would have little value as anti-galling ingredients.

In contrast, it was found by the instant invention that a variety of iodine containing materials are highly successful in preventing galling of a titanium-high density polyethylene bearing couple when water is the lubricant or under dry sliding conditions. Typical examples of suitable iodine compounds are the alkali iodides (KI), those derived from the amines (triethanolamine iodide), iodine solution ($KI.I_2$), or solid iodine ($I_2$) incorporated into the high density polyethylene bearing surface.

In one embodiment of the present invention, small amounts of soluble iodine compounds are added to the water base whereby the water acts as the lubricant and the iodine as the anti-galling ingredient for a titanium-journal high density polyethylene bearing arrangement. The small iodine content of this solution, which is not sufficient to lubricate the mating metal surface as demonstrated by the unchanged coeffecient of friction, has the function of repairing metallic sites on the journal surface which have been deprived of their protective surface oxide layer. This effect produces smooth and vibration-free sliding between the bearing and the journal surface which may be lubricated alternately with either high density polyethylene or water or both.

A second embodiment of the present invention calls for impregnating a high density polyethylene bearing with iodine. When the rubbing surface of said iodine impregnated bearing contacts the rubbing surface of a titanium journal, a thin layer of the impregnated polyethylene is transferred from said bearing to said journal. Subsequently, the iodine can come into intimate contact with the journal surface, thus protecting metallic sites on this surface against scuffing or galling.

Prior to the discovery of stereoregular polymers, (Ziegler, 1952), the only form of polyethylene known at that time was a branched type with a low degree of crystallinity. Due to a lack of structural order, plastic bearings made from this material (Gilman, U.S. Pat. No. 2,246,092 of June 17, 1941) generally referred to as "low density polyethylene" have poor sliding qualities and limited load bearing capability. Although these bearings have been recommended for water lubricated systems, they show severe vibrational motions under dry sliding conditions (see Gilman, column 2, line 29). Since the Gilman patent precedes the discovery of "high density polyethylene," a linear polymer of high structural order, its disclosure is not within the scope of our invention.

According to our invention, the coefficient of friction decreases with the increasing density of polyethylene. Although the load bearing properties are reported to decrease accordingly (Kirk-Othmer, Encyclopedia of Chemical Technology, 2nd Edition, Vol. 14, pages 246–50), this appears to be true for very low melt indices (0.2–0.4) and correspondingly high molecular weights. For polyethylene having higher, more realistic melt indices (5.0–6.0) as disclosed in this patent application, this relationship has not been observed.

Although iodine (along with aluminum chloride and ferric chloride) has been used as a catalytic carrier for halogenating low density polyethylene (Fawcett, U.S. Pat. No. 2,183,556) halogenation, which represents a chemical interaction but not an absorption mechanism, reduces the bearing qualities of polyethylene by destroying its crystallinity. This shows that Fawcett's halogenation, if applied to high density polyethylene would drastically impair the overall characteristics. In the present invention, the iodine remains suspended in the carrier and does not chemically react therewith.

Iodine salts have also been used in cutting composites, where they function as lubricants (Compton, U.S. Pat. No. 3,215,630 of Nov. 2, 1965). This is in contrast to our process, where polyethylene is the lubricant and iodine being present in quantities of less than one tenth of a percent for the purpose of preventing scuffing or galling. Although the high density polyethylene metal couple slides smoothly in the presence of water used as an auxiliary lubricant, galling may occur when foreign solid matter such as silt or sand is introduced. Thus the function of the iodine containing material, according to our invention, is to reestablish smooth and vibration-free sliding, thus repairing the titanium or other metal surface.

Although titanium has been used as a journal material when furnished with a proper protective coating (McCullough, U.S. Pat. No. 2,622,993 of Dec. 23, 1952), no process is known whereby unprotected titanium can be used satisfactorily as a member of a bearing couple when water is the lubricant. This is in contrast to our invention where a high density polyethylene material is used as the bearing which lubricates the mating unprotected titanium surface, with water being used as the auxiliary lubricant and an iodine containing material as the anti-galling ingredient.

The following table compares pertinent material characteristics of two types of polyethylene with their frictional qualities. It shows that ultra high molecular weight polyethylene ($d = 0.940$) has extraordinary impact strength part of which must be sacrificed if ultimate frictional qualities according to the present invention are the goal.

| | High Density Polyethylene | |
|---|---|---|
| | Ultra High Molecular Weight | Ultra High Density |
| Density (gr/cm$^3$) | 0.940 | 0.962 |
| Youngs Modulus (PSI) | 90,000 | 180,000 |
| Water Absorption (%) | 0.03 | 0.03 |
| Impact (Izod) 73°F (ft-lbs/in) | No Break | 1.6 |
| Friction, Dry | 0.16 | 0.10 |
| wet | 0.09 | 0.05 |

According to this invention, polyethylene, to have minimum friction in the dry and wet state and showing no signs of vibrational motions, must have a density of at least 0.950, a melt index of at least 5.0, and an iodine content of at least 0.05 percent but less than 1 percent. Likewise, since the water is the lubricant and the dissolved iodine serves only as an anti-galling ingredient, its concentration in the aqueous phase is less than 1 percent by volume.

The following examples serve to illustrate the present invention without, however, limiting the same thereto:

Example 1: Ten grams triethanolamine were mixed with 150 mls water. Five grams iodine were then added with shaking and the iodine dissolved within a few minutes to give a clear and colorless solution containing the triethanolamine complex. More water was then added to bring the volume to 200 mls.

Figure 4A:
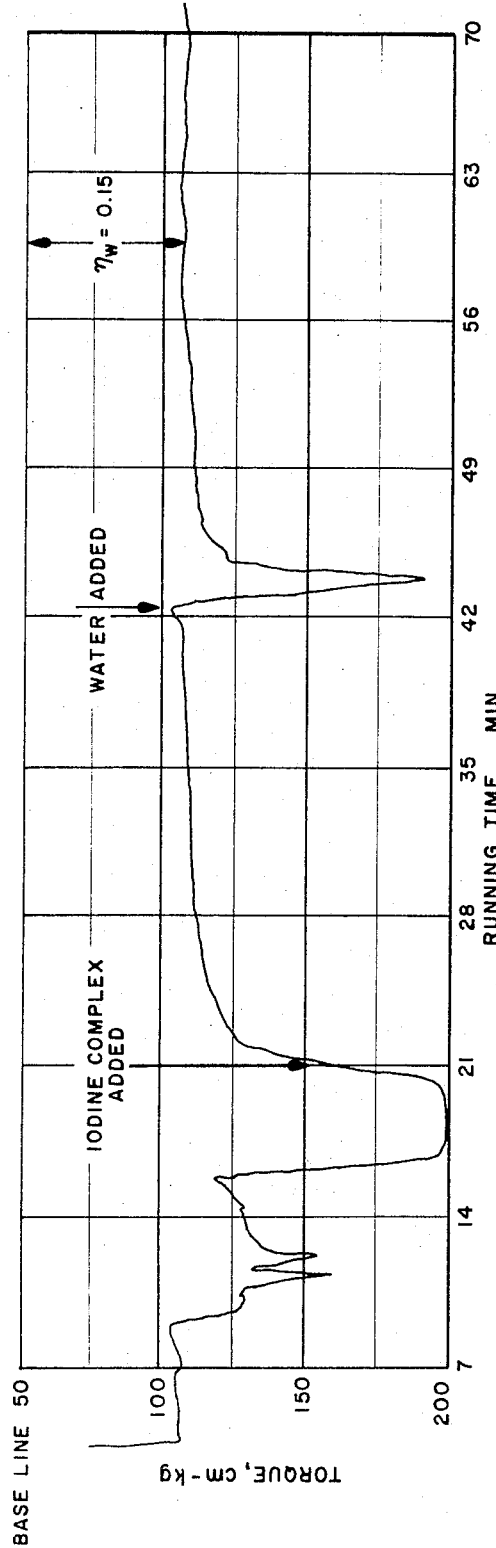
FIG. 4a depicts the same information as FIG. 3 except a water lubricant containing triethanolamine is applied between the sliding surfaces.

When this solution was added drop-wise to a water-lubricated circular titanium journal which was in sliding contact with a high density polyethylene bearing having a density of 0.950, the severe frictional vibrations induced by the presence of a trace of iron oxide abrasive was re-established. Subsequently, when plain water was substituted for this aqueous solution containing this water-soluble iodine complex, vibrationfree sliding and a low coefficient of friction was maintained for indefinite periods of time and no vibration phenomena recurred (FIG. 4a).

Figure 4B:
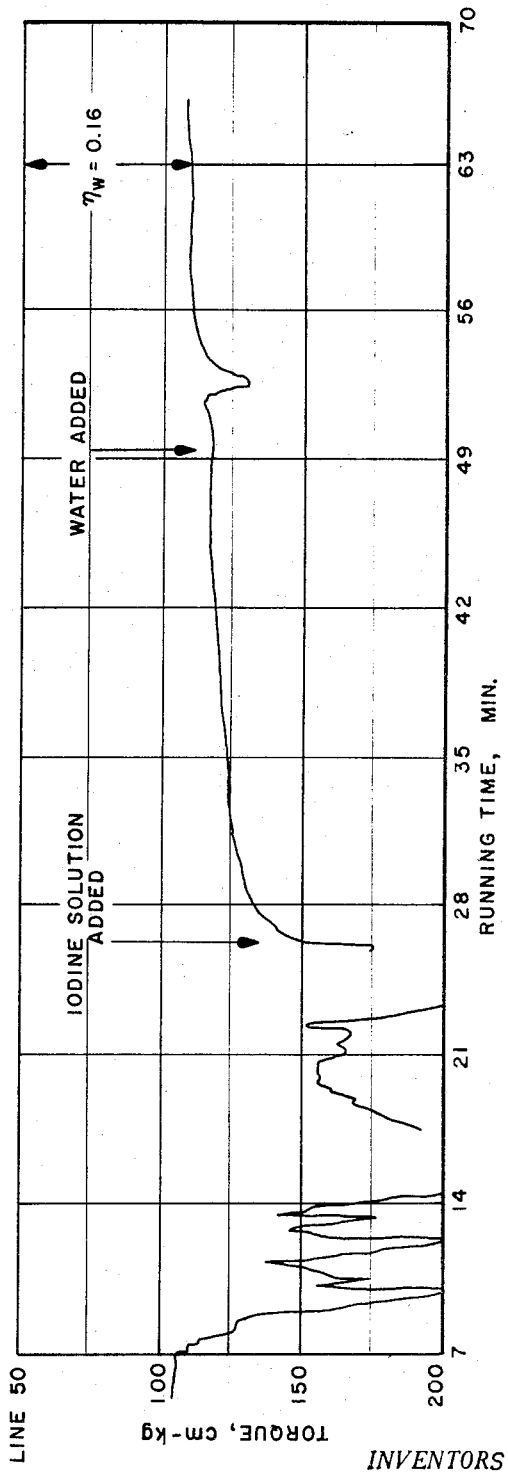
FIG. 4b depicts the same information as FIG. 4a except iodine solution is added to the water lubricant.

Example 2: In a manner similar to Example 1, a water-soluble complex of iodine and potassium iodide was used to prevent scuffing of a high density polyethylene bearing having a density of 0.950 sliding against a titanium journal. The iodine solution had a concentration of 1.3 percent with regard to iodine and 2.2 percent with regard to potassium iodide and was added to the water-lubricated interface at a rate of 2 mls per minute. Frictional peaks observed disappeared instantaneously and the bearing operated with water as the sole lubricant for indefinite periods of time afterwards without recurrence of vibrational phenomena (FIG. 4b).

Figure 4C:
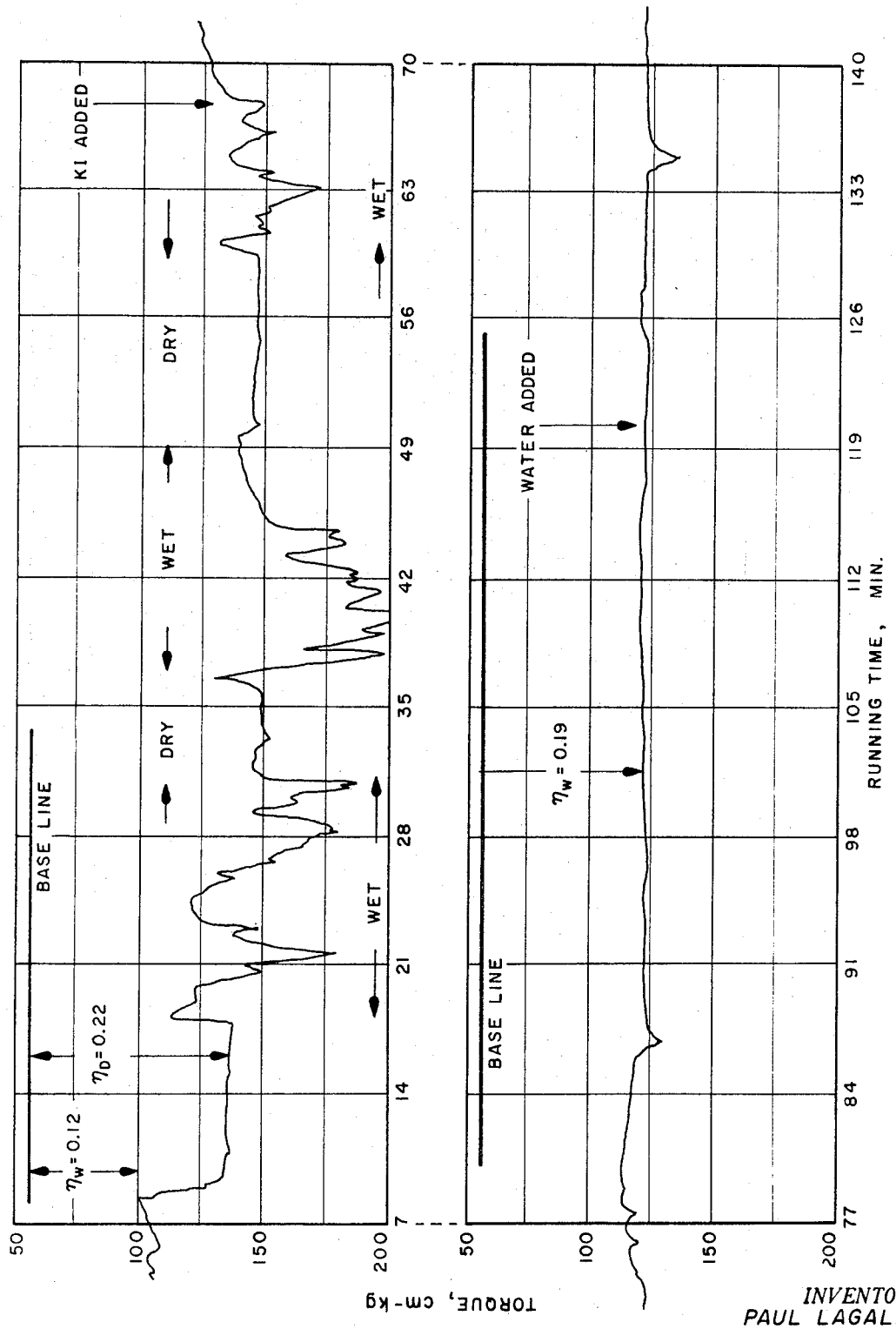
FIG. 4c depicts the same information as FIG. 4a except potassium iodide is added to the water lubricant.

Example 3: In a similar fashion as described in Examples 1 and 2 an aqueous solution (0.83 percent) of potassium iodide was used to prevent scuffing of a polyethylene bearing sliding against a titanium journal. As can be seen from FIG. 3, scuffing of a polyethylene bearing-titanium journal, which has occurred over a long period of time (more than 1 hour) was stopped immediately by the addition of an aqueous potassium iodide and could operate then with a water lubricant alone. (FIG. 4c).

Example 4: To demonstrate that the iodine required for smooth sliding can also be supplied by the plastic bearing itself, a one inch cube (15.1922 grams) of high density polyethylene (commercially known as HI-FAX 1900) was placed in a vacuum desiccator together with a Petri dish containing some iodine. The polyethylene cube turned instantaneously brown by the absorbed iodine. After 2 weeks, 0.0133 grams (0.09 percent) iodine had been absorbed.

After scuffing had been induced by adding a minute amount of an abrasive ($Fe_2O_3$) to the circular titanium journal, the initially used plain high density polyethylene bearing was replaced by the bearing containing the absorbed iodine. The ability of the latter to arrest scuffing or galling of the circular titanium journal was demonstrated convincingly by smooth sliding performance which occurred instantly and by the decreased coefficient of friction in the dry and wet state (FIG. 5).

It was also noticed that titanium in rubbing contact with plain polyethylene formed a layer of debris which could be wiped off easily. With iodine present, a more bluish-looking surface layer, apparently titanium iodide was formed which appeared to have greater density and could not be wiped off.

Although throughout the above discussion the bearing material has been high density polyethylene and the journal material titanium, the principles of the instant invention would similarly apply if the journal were high density polyethylene and the bearing were titanium.

Obviously many modifications and variations of the present invention are possible in the light of the above teachings. It is therefore to be understood that within the scope of the appended claims, the invention may be practiced otherwise than as specifically described.

What is claimed:

1. A low friction bearing-journal arrangement, which comprises:
   a first member formed from a high density polyethylene containing physically absorbed iodine; and
   a second member which mates with said first member, and is formed from titanium.

2. A low friction bearing-journal arrangement as recited in claim 1 wherein the amount of absorbed iodine is about 0.05 percent to about 1 percent.

3. A low friction bearing-journal arrangement as recited in claim 1 wherein the high density polyethylene has a melt index from about 5.0 to about 6.0, and a density from about 0.950 to about 0.962.

4. A low friction bearing-journal arrangement as recited in claim 3 wherein the amount of absorbed iodine is about 0.05 percent to about 1 percent.

* * * * *